(12) United States Patent
Mouton et al.

(10) Patent No.: US 8,899,255 B2
(45) Date of Patent: Dec. 2, 2014

(54) TURBOJET NACELLE HAVING A REMOVABLE AIR INTAKE STRUCTURE

(75) Inventors: Herve Jean Albert Mouton, Acheres la Foret (FR); Thomas Alain Christian Vincent, Palaiseau (FR)

(73) Assignee: SNECMA, Paris (FR)

( * ) Notice: Subject to any disclaimer, the term of this patent is extended or adjusted under 35 U.S.C. 154(b) by 770 days.

(21) Appl. No.: 13/203,094

(22) PCT Filed: Feb. 4, 2010

(86) PCT No.: PCT/FR2010/050175
§ 371 (c)(1),
(2), (4) Date: Aug. 24, 2011

(87) PCT Pub. No.: WO2010/097532
PCT Pub. Date: Sep. 2, 2010

(65) Prior Publication Data
US 2011/0308634 A1  Dec. 22, 2011

(30) Foreign Application Priority Data
Feb. 24, 2009  (FR) ...................................... 09 51154

(51) Int. Cl.
*F02C 7/04* (2006.01)
*B64D 29/06* (2006.01)
*B64D 33/02* (2006.01)

(52) U.S. Cl.
CPC . *B64D 29/06* (2013.01); *F02C 7/04* (2013.01); *B64D 2033/0286* (2013.01)
USPC ...... 137/15.1; 60/226.1; 244/53 B; 244/129.4

(58) Field of Classification Search
CPC .................. B64D 29/06; B64D 33/02; B64D 2033/0286; F02C 7/04
USPC ............ 137/15.1; 244/53 B, 129.4; 60/226.1, 60/796
See application file for complete search history.

(56) References Cited

U.S. PATENT DOCUMENTS 2,599,037 A * 6/1952 Anderson ................... 123/41.59
3,750,689 A * 8/1973 Britt ............................. 137/15.1

(Continued)

FOREIGN PATENT DOCUMENTS

FR  2 906 568  4/2008

OTHER PUBLICATIONS

International Search Report issued May 20, 2010 in PCT/FR10/050175 filed Feb. 4, 2010.

*Primary Examiner* — Ehud Gartenberg
*Assistant Examiner* — Lorne Meade
(74) *Attorney, Agent, or Firm* — Oblon, Spivak, McClelland, Maier & Neustadt, L.L.P.

(57) ABSTRACT

A turbojet engine nacelle, including an air intake structure for directing an airflow towards a fan of the turbojet engine, a middle structure attached to the air intake structure for surrounding the fan of the turbojet engine, the air intake structure including an inner panel attached to the middle structure and defining a fixed structure with the middle structure, and an outer panel including an air intake lip at the end thereof opposite the middle structure, the outer panel being longitudinally translatably movable relative to the inner panel. The nacelle further includes at least one rod having one end attached onto a flange of the air intake lip and a mechanism rigidly connected to the middle structure for securing and locking the other end of each rod by applying a traction force thereon.

8 Claims, 4 Drawing Sheets

(56) References Cited

U.S. PATENT DOCUMENTS

| | | | |
|---|---|---|---|
| 4,320,912 A * | 3/1982 | Grace et al. | 292/341.18 |
| 4,365,775 A * | 12/1982 | Glancy | 244/53 R |
| 4,658,579 A | 4/1987 | Bower et al. | |
| 5,000,399 A * | 3/1991 | Readnour et al. | 244/53 B |
| 5,014,933 A * | 5/1991 | Harm et al. | 244/53 B |
| 5,737,914 A * | 4/1998 | Porte et al. | 60/226.1 |
| 7,383,679 B2 * | 6/2008 | Porte et al. | 60/226.1 |
| 8,181,905 B2 * | 5/2012 | McDonough et al. | 244/53 B |
| 2003/0151261 A1 | 8/2003 | Porte et al. | |
| 2010/0084507 A1 | 4/2010 | Vauchel et al. | |
| 2010/0314501 A1 * | 12/2010 | Vauchel et al. | 244/53 B |
| 2011/0014044 A1 * | 1/2011 | Vauchel et al. | 415/214.1 |
| 2011/0068222 A1 * | 3/2011 | Vauchel et al. | 244/1 N |

\* cited by examiner

TURBOJET NACELLE HAVING A REMOVABLE AIR INTAKE STRUCTURE

BACKGROUND OF THE INVENTION

The present invention relates to the general field of nacelles fitted to turbojets.

A turbojet nacelle generally comprises an upstream air intake structure for channeling the stream of air towards the turbojet fan, a middle structure that is fastened to the air intake structure and that serves to surround the turbojet fan, and a downstream structure giving access to the central portion of the turbojet and housing a thrust reverser system.

Maintenance operations on a turbojet fitted with such a nacelle require manufacturers to provide access hatches in the nacelle. In particular, it is common practice for the middle structure of the nacelle to be fitted with semicylindrical covers that are hinged about longitudinal axes in order to provide access to the turbojet while maintenance operations are performed thereon.

Nevertheless, the presence of covers has the harmful consequences of increasing the drag of the nacelle and of increasing its weight. In order to mitigate those drawbacks, proposals have been made for a portion of the air intake structure of the nacelle to be removable. That solution gives easy access to the turbojet during maintenance. Reference may be made in particular to patent application FR 2 906 568, which describes an embodiment of a nacelle having a removable air intake structure. By eliminating the covers, the drag and the weight of the nacelle are reduced.

That type of nacelle having a removable air intake structure nevertheless raises a problem at the junction between the portion of the structure that can be removed and the portion that remains stationary. When the nacelle is in the closed position, the presence of clearance between those two elements gives rise to aerodynamic disturbances that harm the performance of the turbojet and give rise to leaks of air into the compartment of the air intake structure.

In order to minimize that clearance, proposals have been made to fill it with a gasket or to make provision for the stationary and removable portions of the air intake structure to overlap in part when the nacelle is in the closed position. Such arrangements are nevertheless not fully satisfactory since they continue to give rise to aerodynamic disturbances in operation.

OBJECT AND SUMMARY OF THE INVENTION

A main aim of the present invention is thus to mitigate such drawbacks by proposing a turbojet nacelle including an air intake structure for channeling a stream of air towards a fan of the turbojet, a middle structure fastened to the air intake structure and serving to surround the fan of the turbojet, the air intake structure comprising an internal panel fastened to the middle structure and co-operating therewith to form a stationary structure, and an external panel incorporating an air intake lip at its end remote from the middle structure, the external panel being movable in longitudinal translation relative to the internal panel, the nacelle being characterized in that it further comprises at least one rod having one end fastened on a flange of the air intake lip and means that are secured to the middle structure for attaching and locking the other end of each rod by exerting a traction force thereon.

The locking of the docking zone between the air intake lip and the internal panel of the invention present numerous advantages. In particular, this locking is performed by exerting a traction force on the rods, and thus on the air intake lip, in such a manner as to ensure that no clearance remains in operation between the stationary and removable portions of the air intake structure. Even if the removable portion of the air intake structure tends to move away, the rods prestressed in this way exert a permanent compression force on the junction between the flange of the air intake lip and the corresponding flange of the internal panel. This ensures that there is no clearance between the stationary and removable portions of the air intake structure.

In addition, the attachment and locking means are carried by the middle structure, so it is possible to position them in such a manner as to make them visible and accessible from the outside. It is thus easy prior to takeoff of the airplane to verify that the removable portion of the air intake structure is securely attached to its stationary portion.

In an advantageous provision of the invention, each rod is covered in a vibration-damper material. The presence of such a material serves to damp the vibration to which the rod is subjected in operation. Because the rods are long and flexible, they run the risk of having resonant modes of vibration that lie in the range of operating frequencies of the turbojet, which might give rise to wear and/or to a risk of fatigue fracture.

According to another advantageous provision of the invention, each rod is held by clip-fastening in a notch formed in an inner wall of the air intake structure. This also serves to reduce any risk of the rod fracturing.

The attachment and locking means for each rod may comprise an attachment member hinged about a pin to the middle structure, the rod terminating in a loop that co-operates with the attachment member. Under such circumstances, the attachment member is preferably actuated manually by means of a handle housed in a hatch of the nacelle, which hatch is formed at the outer periphery of the middle structure.

According to yet another advantageous provision of the invention, the air intake lip is provided at its flanges with centering pegs that are received in notches of complementary shapes provided in the corresponding flanges of the internal panel.

Each rod may be fastened to the flange of the air intake lip by means of a ball joint and it may be made of steel.

Preferably, the nacelle includes a plurality of rods regularly distributed around a longitudinal axis of the nacelle.

The invention also provides a turbojet including a nacelle as defined above.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF AN EMBODIMENT

Figure 1:
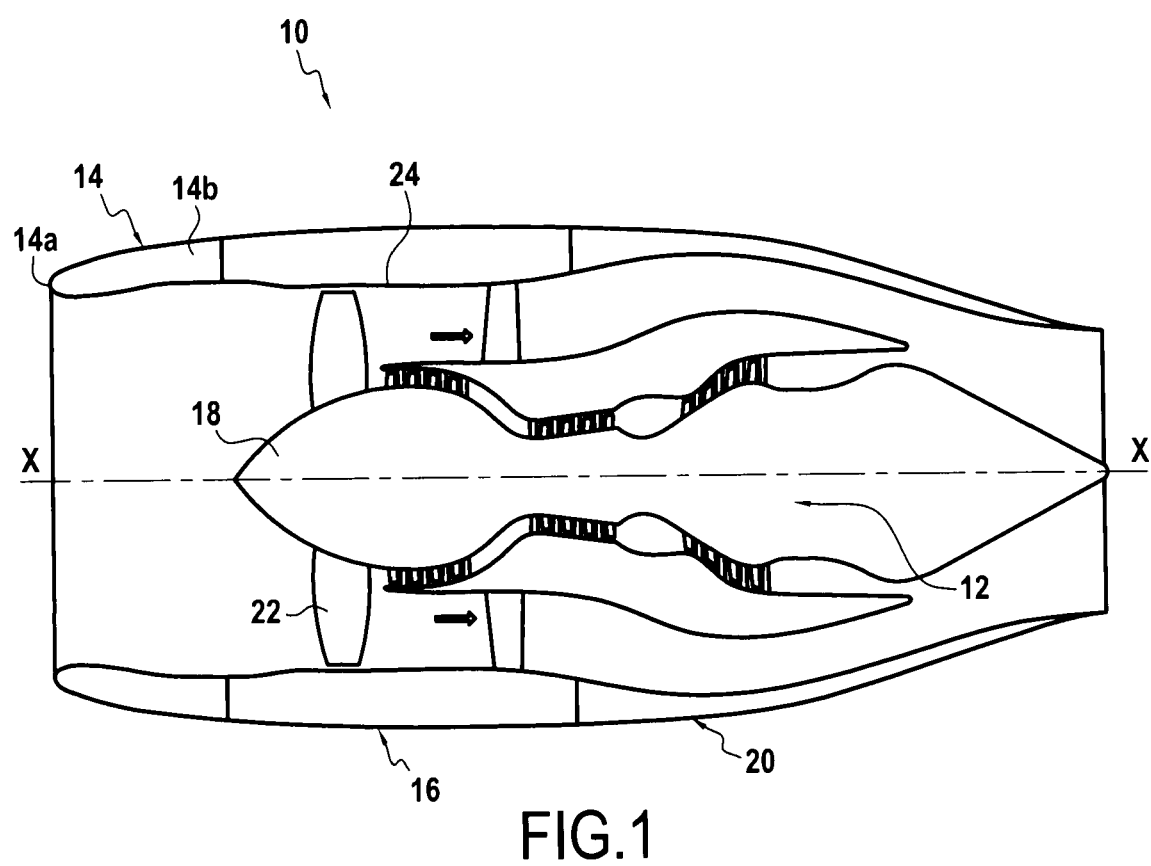
FIG. 1 is a highly diagrammatic longitudinal section view of a turbojet nacelle of the invention.

FIG. 1 is a longitudinal section view of the general structure of a nacelle 10 of the invention. The nacelle constitutes an annular housing for a turbojet 12 for which it serves to channel the streams of gas that it generates by defining aerodynamic lines inside and outside the turbojet.

The nacelle 10 is centered on the longitudinal axis X-X of the turbojet 12. From upstream to downstream in the flow direction of the gas stream passing therethrough, the nacelle comprises an upstream structure 14 forming an air intake, a middle structure 16 surrounding the fan 18 of the turbojet, and a downstream structure 20 giving access to the central portion of the turbojet 12, and sheltering a thrust reverser system (not shown).

More precisely, the air intake structure 14 of the nacelle comprises two portions that are connected together: an air intake lip 14a of aerodynamic profile adapted to enable optimized capture of the air needed for feeding the fan 18 of the turbojet, and a rear structure 14b for appropriately channeling air towards the blades 22 of the fan 18.

Figure 2:
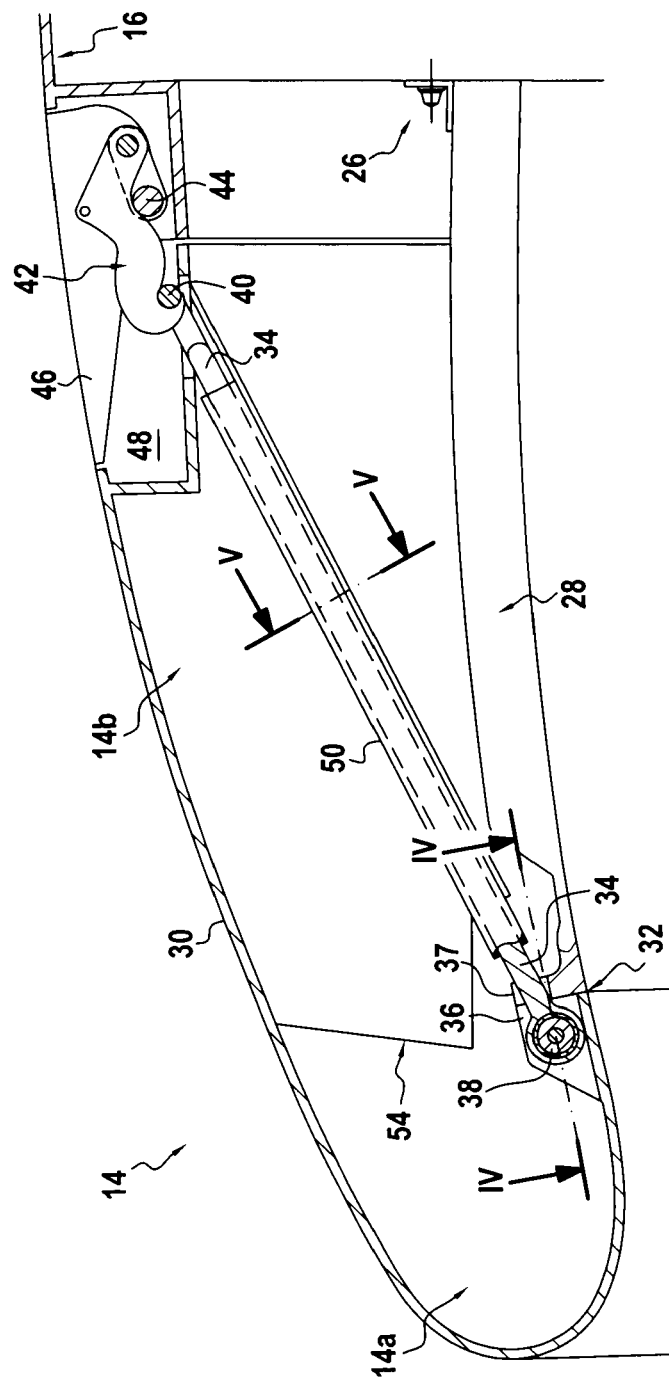
FIG. 2 is a view on a larger scale of the junction zone between the stationary and removable portions of the air intake structure of the FIG. 1 nacelle.
Figure 3:
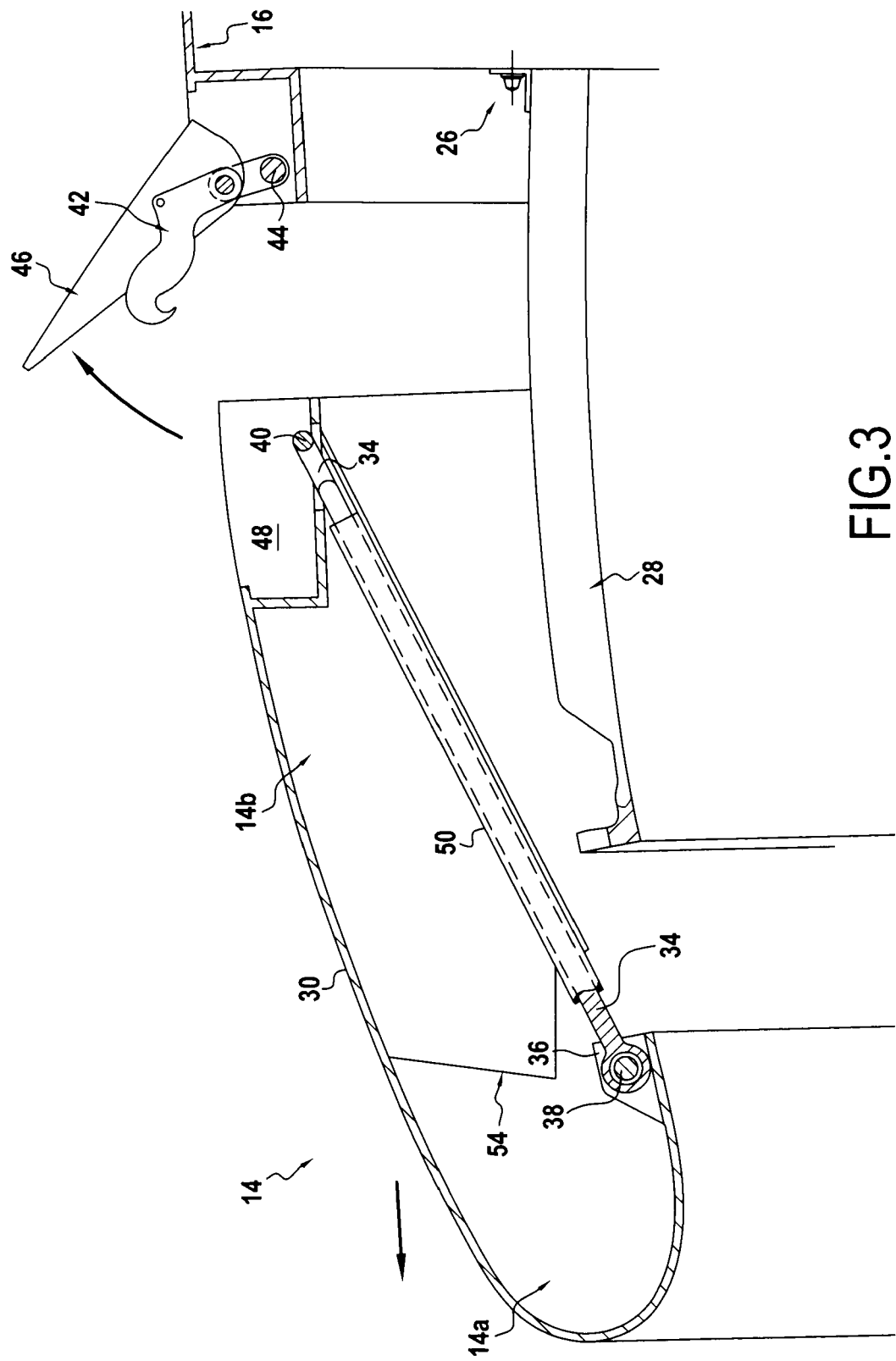
FIG. 3 is a view on a larger scale of the FIG. 2 junction zone in the open position of the air intake structure.

The air intake structure 14 as defined in this way is connected to the upstream end of a casing 24 of the fan 18 that forms part of the middle structure 16 of the nacelle, the attachment being by means of fastener flanges 26 (see FIGS. 2 and 3).

Furthermore, as shown in particular in FIGS. 2 and 3, the air intake structure 14 has an internal panel 28 that is fastened to the middle structure 16 so as to co-operate therewith in forming a stationary structure, and an external panel 30 that incorporates the air intake lip 14a at its end remote from the middle structure.

The internal panel 28 is made of acoustic material and it is connected via fastener flanges 26 to the casing 24 forming part of the middle structure 16. The internal panel 28 thus constitutes a stationary structure.

The external panel 30 surrounds a portion of the internal panel and extends (upstream) beyond it in the form of the air intake lip 14a, which lip forms a junction 32 with the upstream end of the internal panel 28.

In addition, the external panel 30 of the nacelle of the invention is movable in longitudinal translation (i.e. it can slide) relative to the internal panel 28. Thus, FIG. 2 shows the air intake structure in the closed position (corresponding to the turbojet in operation), while FIG. 3 shows the same structure in the open position, giving access to the turbojet (for a maintenance operation on the turbojet).

The external panel 30 of the air intake structure may be opened or closed manually or automatically (e.g. using electrical or hydraulic actuator means). Furthermore, when the air intake structure is of large dimensions, it is possible to envisage having recourse to means for guiding the external panel (such as a system of rails and slideways, for example).

When the external panel 30 of the air intake structure is in the closed position (as shown in FIG. 2), it is necessary for the clearance at the junction 32 between the air intake lip 14a and the upstream end of the internal panel 28 to be as small as possible.

To this end, the nacelle 10 of the invention includes at least one rod 34—and preferably a plurality of rods that are regularly distributed around the longitudinal axis X-X—with one end fastened to the flange 36 of the air intake lip 14a, said flange being arranged at the junction 32 and put into abutment against a corresponding flange 37 of the internal panel 28 when the external panel is in the closed position.

Figure 4:
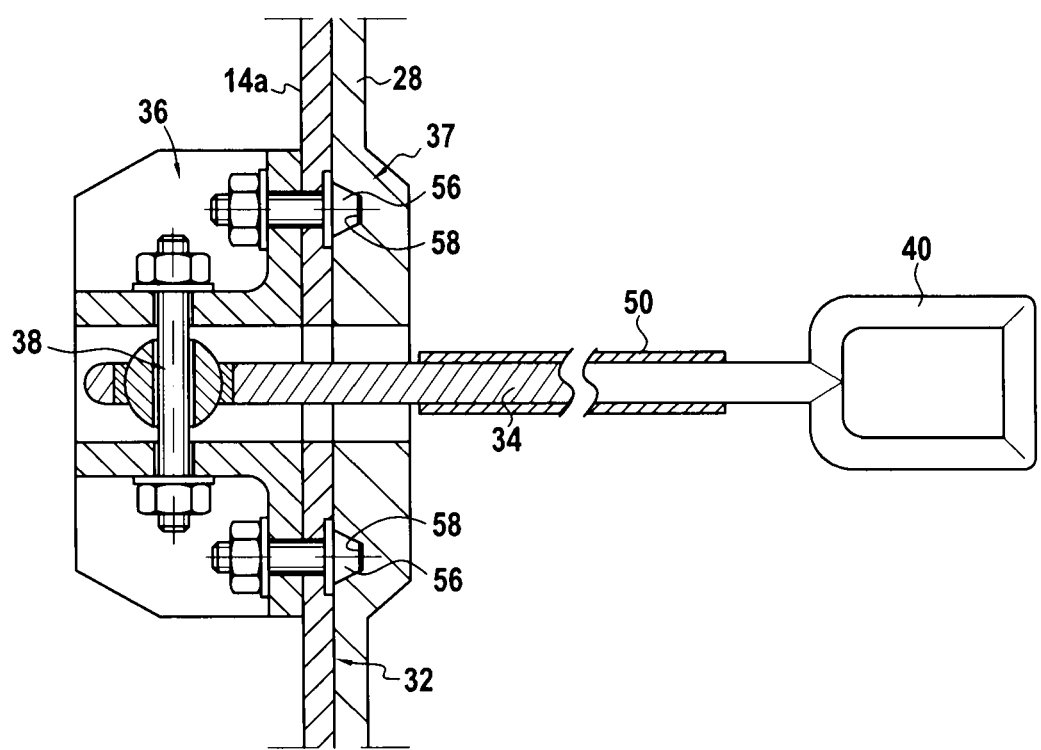
FIGS. 4 and 5 are section views of FIG. 2 respectively on IV-IV and on V-V.

More precisely, each rod 34 is fastened to the flange 36 of the air intake lip by means of a ball joint 38 that can be seen in particular in FIG. 4.

Furthermore, at its other end, each rod 34 has a loop 40 (FIG. 4) that is designed to co-operate with a hook-forming attachment member 42, which member is hinged about a pin 44 on the middle structure 16. This attachment member 42 serves to lock the other end of the rod via its loop 40 while exerting a traction force thereon.

Thus, when the external panel 30 of the air intake structure is to be closed, it is slid towards the internal panel 28 and the attachment members 42 are actuated so as to lock the loops of the rods. This locking also gives rise to a traction force on the rods that give rise to permanent compression in the junction 32 between the flanges 36 of the air intake lip 14a and the corresponding flanges 37 of the internal panel 28. As a result, when the external panel of the air intake structure is in the closed position, no clearance remains in said junction 32 and there is no break in aerodynamic continuity between the air intake lip and the internal panel.

The attachment member 42 may be actuated manually by means of a handle 46 housed in a hatch 48 in the nacelle, said hatch advantageously being formed in the outer periphery of the middle structure 16. With such an arrangement, the attachment member is easily accessible and it is thus easy to verify visually that the external panel of the air intake structure is properly locked. Furthermore, in the closed position, the handle 46 is flush with the outside surface of the nacelle so as to minimize aerodynamic disturbances.

The rods 34 are made of a material presenting a certain amount of elasticity so as to be capable of lengthening a little without breaking under the traction force exerted by the attachment members when locking the air intake lip. By way of example, for a rod having a length of 1 meter (m), the lengthening to which it will be subjected under the effect of traction in order to compensate clearance of 5 millimeters (mm) in the junction 32 corresponds to 0.50 of its length. An example of a material presenting such elasticity characteristics is steel.

According to an advantageous characteristic of the invention, each rod is covered in a vibration-damping material. Because the rods are long and flexible they run the risk of presenting resonant loads of vibration that lie in the range of operating frequencies of the turbojet, which could give rise to wear and/or to a risk of these rods suffering a fatigue fracture.

Figure 5:
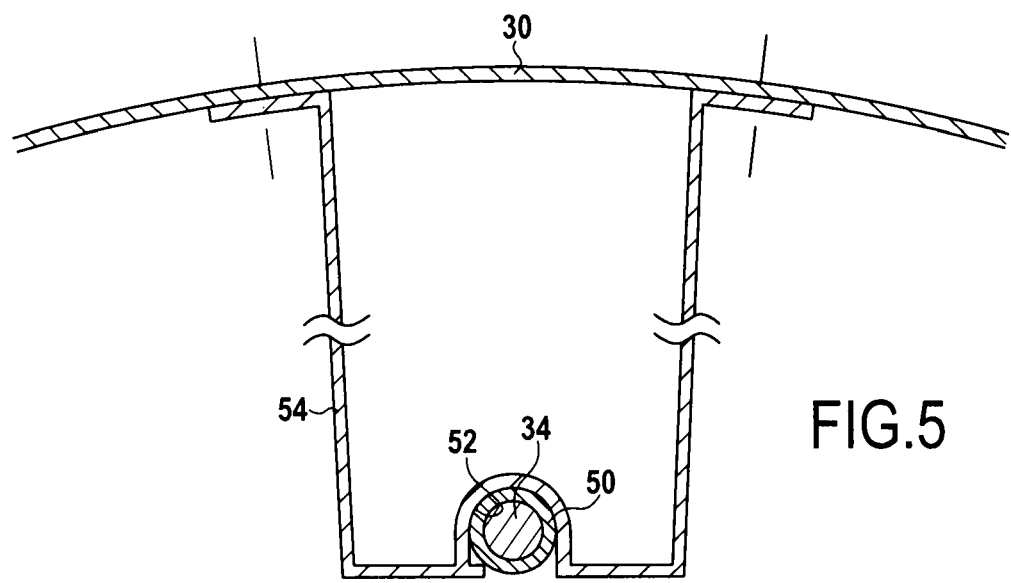

In FIGS. 2, 3, and 5, the rod 34 is shown as being covered in a silicone sleeve 50. Naturally, any other material suitable for damping the vibration to which the rods are subjected in operation could be used.

According to another advantageous characteristic of the invention, as shown in FIG. 5, each rod is clip-fastened in a notch 52 of circular section that is formed in an inside wall 54 of the air intake structure 14 (such walls forming axial stiffeners are commonly to be found inside a removable air intake structure). Holding the rods in this way also serves to damp the vibration to which they are subjected in operation.

According to yet another advantageous characteristic of the invention, as shown in FIG. 4, the air intake lip is provided in its flanges 36 with centering pegs 56 for being received in notches 58 of complementary shape provided in the corresponding flanges 37 of the internal panel 28 during closure of the external panel.

The invention claimed is:

1. A turbojet nacelle comprising:
   an air intake structure for channeling a stream of air towards a fan of the turbojet;
   a middle structure fastened to the air intake structure, the middle structure having an external housing with an internal casing serving to surround the fan of the turbojet;
   the air intake structure comprising an internal panel fastened to the internal casing of the middle structure and co-operating therewith to form a stationary structure, and an external panel incorporating an air intake lip at an end of the external panel remote from the middle structure, the external panel being movable in longitudinal translation relative to the internal panel; and further comprising at least one rod including a first end and a second end, the first end fastened on a flange of the air intake lip and the second end terminating in a loop; and an attachment member hinged about a pin secured to a hatch in the external housing of the middle structure, the attachment member engaging the loop of the second end for attaching and locking the external panel to the middle structure by exerting a traction force on the at least one rod, the attachment member actuated manually by a handle housed in the hatch.

2. A nacelle according to claim 1, wherein the at least one rod is covered in a vibration-damper material.

3. A nacelle according to claim 1, wherein the at least one rod is held by clip-fastening in a notch formed in an inner wall of the air intake structure.

4. A nacelle according to claim 1, wherein the flange of the air intake lip includes a plurality of centering pegs that are received in notches of complementary shapes provided in a corresponding flange of the internal panel.

5. A nacelle according to claim 1, wherein the at least one rod is fastened to the flange of the air intake lip by a ball joint.

6. A nacelle according to claim 1, wherein the at least one rod is made of steel.

7. A nacelle according to claim 1, including a plurality of the at least one rod regularly distributed around a longitudinal axis of the nacelle.

8. A turbojet including a nacelle according to claim 1.

* * * * *